US008735471B2

(12) United States Patent  
Menning

(10) Patent No.: US 8,735,471 B2  
(45) Date of Patent: May 27, 2014

(54) POLYOLEFIN DISPERSIONS, FROTHS, AND FOAMS

(71) Applicant: Dow Global Technologies LLC, Midland, MI (US)

(72) Inventor: Bruce Menning, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/933,150

(22) Filed: Jul. 2, 2013

(65) Prior Publication Data

US 2013/0302583 A1 Nov. 14, 2013

Related U.S. Application Data

(60) Division of application No. 13/080,567, filed on Apr. 5, 2011, now Pat. No. 8,507,589, which is a continuation of application No. 12/446,945, filed as application No. PCT/US2007/082539 on Oct. 25, 2007, now Pat. No. 8,349,920.

(60) Provisional application No. 60/854,144, filed on Oct. 25, 2006.

(51) Int. Cl.
    *C08L 1/00* (2006.01)
    *C08F 210/00* (2006.01)

(52) U.S. Cl.
    USPC .......................................... 524/35; 521/144

(58) Field of Classification Search
    USPC .......................................................... 524/35
    See application file for complete search history.

(56) References Cited

U.S. PATENT DOCUMENTS

| 5,132,171 A * | 7/1992 | Yoshizawa et al. ........ 428/317.1 |
| 7,361,694 B2 * | 4/2008 | Strandburg et al. ............. 521/61 |
| 2005/0176836 A1 * | 8/2005 | Dontula et al. ................. 521/79 |

OTHER PUBLICATIONS

EP Office Action dated Jun. 25, 2013; from EP counterpart Application No. 07844607.7.
Australia Response to Examiner Report dated Sep. 12, 2013; from Australia counterpart Application No. 2011218609.
Chinese 2nd Office Action dated May 6, 2013; from Chinese counterpart Application No. 200780047922.6.
Instructions to Chinese 2nd Office Action dated Jul. 15, 2013; from Chinese counterpart Application No. 200780047922.6.
Chinese Response to 2nd Office Action dated Jul. 21, 2013; from Chinese counterpart Application No. 200780047922.6.
Chinese Office Action (Decision of Final Rejection) dated Aug. 29, 2013; from Chinese counterpart Application No. 200780047922.6.
Instructions to EP Office Action dated Oct. 16, 2013; from EP counterpart Application No. 07844607.7.
EP Response to Office Action dated Nov. 4, 2013; from EP counterpart Application No. 07844607.7.
Instructions to EP Divisional Office Action dated Jan. 8, 2014; from EP Divisional counterpart Application No. 11177956.7.
EP Divisional Response to Office Action dated Nov. 29, 2013; from rom EP Divisional counterpart Application No. 11177956.7.

* cited by examiner

*Primary Examiner* — Hui Chin

(57) ABSTRACT

Polyolefin dispersions, froths, and foams and articles manufactured therefrom are disclosed. Also disclosed is a method for generating a thermoplastic foam from an aqueous dispersion. The aqueous dispersion may include a thermoplastic resin, water, and a stabilizing agent. The method may include adding at least one frothing surfactant to the aqueous dispersion to form a mixture, adding a flame retardant and/or a phase change material, frothing the mixture to create a froth, and removing at least a portion of the water to produce the foam.

9 Claims, 1 Drawing Sheet

POLYOLEFIN DISPERSIONS, FROTHS, AND FOAMS

CROSS REFERENCE TO RELATED APPLICATION

This application is a divisional of Continuation application Ser. No. 13/080,567, filed Apr. 5, 2011, now U.S. Pat. No. 8,507,589, which claimed priority to application Ser. No. 12/446,945, filed on Apr. 23, 2009, now U.S. Pat. No. 8,349,920, which was a National Stage Entry of PCT/US07/82539 filed on Oct. 25, 2007, which in turn claimed priority to U.S. Provisional Application No. 60/854,144, filed on Oct. 25, 2006, the entire contents of which are hereby incorporated by reference.

BACKGROUND OF INVENTION

1. Field of the Invention

Embodiments disclosed herein relate generally to the production of polyolefin foams. Specifically, embodiments disclosed herein relate to polyolefin dispersions, froths, and foams containing flame retardants and/or phase change materials.

2. Background Art

The physical and mechanical properties of polymeric foams make them suitable for a wide variety of applications such as fire barriers, absorbent articles, sound deadening, thermal insulation, sports protective equipment, and packaging materials. There are six basic types of foams and foam materials: open cellular, closed cellular, flexible, rigid, reticular, and syntactic. Open cellular foams have interconnected pores or cells and are suitable for filtration applications. Closed cellular foams do not have interconnected pores or cells, but are useful for buoyancy or flotation applications. Flexible foams can bend, flex or absorb impacts without cracking or delaminating. Reticular foams have a very open structure with a matrix consisting of an interconnecting network of thin material strands. Rigid foams feature a matrix with very little or no flexibility. Syntactic foams consist of rigid microspheres or glass micro-balloons held together by a plastic or resin matrix. A burgeoning area within foam technology is the development of flame retardant foams to meet the demands imposed by stricter governmental standards for flame retardant articles.

The most common method of decreasing the flammability of polymeric foams is to incorporate a flame retarding agent, such as a halogenated compound or a phosphate ester into the foam formulation. While such compounds provide some improvement in the flame retardation properties of the foams, the incorporation of these materials may impair other foam properties. For example, in the upholstered furniture industry, where there has been an increase in the stringency of governmental flame retardancy standards, conventional flame retardant systems often degrade the soft feel of the fabric due to an increase in stiffness associated with incorporation of the flame retardant system.

Because combustion requires air, closed cell foams have been frequently used in flame retardant applications due to the limited amount of accessible combustible air entrapped in the closed cell foam material. Typically, closed cell foams are formed using gas blowing agents other than air, such as fluorohydrocarbons, to create the foam structure. However, because of the closed cell structure, the limited volume available in closed cell foams restricts the amount of flame retardant additives that may be incorporated while maintaining the integrity of the foam structure. Furthermore, when applying a flame retardant foam to fabrics, where a soft feel may be important to a consumer, closed cell foams are generally considered less desirable as they tend to be stiff.

Additionally, the closed cell structure may limit the type of flame retardant additives that may be incorporated, and may also limit the methods by which flame retardants may be incorporated into the foam. For example, closed cell gas blown foams may be made flame retardant via the incorporation of flame retardant additives such as brominated, chlorinated, or phosphorous based materials. The amount of these flame retardant materials that may be incorporated is limited in some cases by the compatibility of the material with the polymer being foamed. Gas blown foams require good film forming properties in order for a foam to be formed. Use of flame retardant additives that are particulate in nature or incompatible with the foaming material may interfere with the film forming properties, making it difficult to forty) a good quality foam.

Another disadvantage of using a closed cell foam in a flame resistant application is that closed cell foams often do not shrink away from the flame source. Because of the trapped gas in the closed cells, closed-cell foams may expand toward the flame providing a good fuel source for the fire.

Open celled foams may be formed by secondary processing of closed cell foams. This may provide for the use of additional methods for incorporation of flame retardants into the foam structure, with limitations known to those in the art.

In contrast to the stiffer closed cell foams discussed above, open cell foams possess the quality of elasticity and soft feel that consumers desire in fabric materials. Open cell structures are generally formed using water (steam) as the blowing agent with air comprising the majority of the void space of the final foam structure. While the open cell structure entraps significant amounts of combustible air, the larger voids provide greater surface area and volume to incorporate greater quantities of flame retardant fillers and other additives. Importantly, the open cell structure may accommodate larger amounts of these additives without compromising the foam structure.

There exist several methods for incorporating flame retardants into foams. For example, flame retardants have typically been incorporated into traditional blown foams by a dry blending process, such as that described in U.S. Patent Publication No. 20040138351. In the '351 publication, polyethylene was dry blended with a variety of possible melamine and organohalogen or organophosphorus flame retardant compositions, and the pelletized blend was then blown into a foam.

In U.S. Pat. No. 5,132,171 an open cell foam containing flame retardants is disclosed. The open cell foam is formed by subjecting a closed cell flame incorporating flame retardants to mechanical compression to rupture the cell membranes and result in an open cell structure. A second flame retardant may be also impregnated in the open cell structure by immersion of the foam in a solution containing the second retardant and wringing out the excess solution. This two step introduction of different retardant agents led to a synergistic improvement in flame retardation.

Another strategy for introducing flame retardants is disclosed in U.S. Patent Publication No. 20010006865 wherein a flame retardant gel-coating is placed over foamed polymeric material. The process can be used with either closed or open cell foams, however, the advantage of gel coating an open cell foam is that the entire foam structure becomes impregnated with the gel-coating through an immersion and wringing process.

A final challenge in the formation of foams is inconsistent and undesired foam collapse during the drying process, thus making the properties of the foam difficult to control. Further complicating this problem may be the presence of surfactants and flame retardant additives which can impact the final foam structure.

Accordingly, there exists a continuing need for the development of foam technologies to enhance flame retardant properties while preserving the basic loam function.

SUMMARY OF INVENTION

In one aspect, embodiments disclosed herein relate to an aqueous dispersion. The aqueous dispersion may include a thermoplastic resin, at least one stabilizing agent, at least one flame retardant, and water.

In another aspect, embodiments disclosed herein relate to an aqueous froth. The aqueous froth may include a thermoplastic resin, water, a frothing surfactant, a gas, and at least one flame retardant.

In other aspects, embodiments disclosed herein relate to a foam derived from an aqueous dispersion, where the aqueous dispersion may include a thermoplastic resin, at least one stabilizing agent, at least one flame retardant, and water.

In other aspects, embodiments disclosed herein relate to a foam derived from an aqueous froth, where the froth may include a thermoplastic resin, water, a frothing surfactant, a gas, and at least one flame retardant.

In another aspect, embodiments disclosed herein relate to a method for generating a flame retardant thermoplastic foam from an aqueous dispersion. The aqueous dispersion may include a thermoplastic resin, water, and a stabilizing agent. The method may include adding at least one frothing surfactant to the aqueous dispersion to form a mixture, adding a flame retardant, frothing the mixture to create a froth, and removing at least a portion of the water to produce the foam.

In another aspect, embodiments disclosed herein relate to an aqueous dispersion. The aqueous dispersion may include a thermoplastic resin, at least one stabilizing agent, at least one phase change material, and water.

In another aspect, embodiments disclosed herein relate to a flame retardant foam. The foam may include a thermoplastic resin and at least one flame retardant, wherein the at least one flame retardant may be from about 5 to about 70 percent of a total weight of the thermoplastic resin and the at least one flame retardant.

In another aspect, embodiments disclosed herein relate to an aqueous froth. The aqueous froth may include a thermoplastic resin, water, a frothing surfactant, a gas, and at least one phase change material.

In another aspect, embodiments disclosed herein relate to a method for generating a thermoplastic roam from an aqueous dispersion. The aqueous dispersion may include a thermoplastic resin, water, and a stabilizing agent. The method may include adding at least one frothing surfactant to the aqueous dispersion to form a mixture, adding a phase change material, frothing the mixture to create a froth, and removing at least a portion of the water to produce the foam, wherein the foam created comprises 20 weight percent or less residual water.

In another aspect, embodiments disclosed herein relate to a foam. The foam may include a thermoplastic resin and at least one phase change material, wherein the at least one phase change material may be from about 5 to about 70 percent of a total weight of the thermoplastic resin and the at least one phase change material.

Other aspects and advantages of the invention will become apparent from the following description and attached claims.

DETAILED DESCRIPTION

Figure 1:
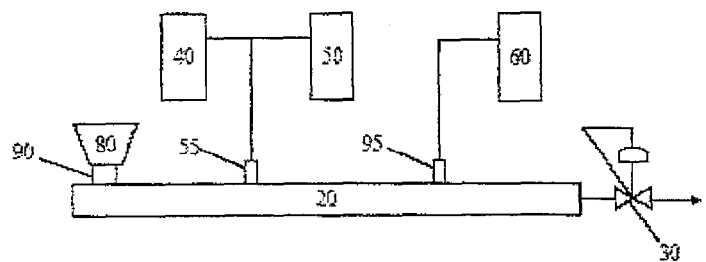
FIG. 1 shows an extruder that may be used in formulating dispersions in accordance with embodiments disclosed herein.

Embodiments disclosed herein relate to flame retardant foams and methods of forming such foams. In particular, certain embodiments relate to foams fanned with thermoplastic resins and flame retardant additives. Other embodiments disclosed herein relate to foams formed with thermoplastic resins and phase change materials. In particular, embodiments relate to foams formed from an aqueous dispersion of polyolefins that are combined with flame retardant additives, phase change materials, or combinations thereof. In the following description, numerous details are set forth to provide an understanding of the present invention. However, it will be understood by those skilled in the art that the present invention may be practiced without these details and that numerous variations or modifications from the described embodiments may be possible.

One embodiment disclosed herein includes a method for generating flame retardant thermoplastic foams. The flame retardant structures of the present disclosure may be formed by mixing flame retardant additives with an aqueous dispersion, wherein the aqueous dispersion may include a thermoplastic resin, water, and a dispersion stabilizing agent. The mixture of the flame retardant additives and the aqueous dispersion may be frothed to create a froth, which may be laid on a fabric or other substrate and subsequently dried to remove at least a portion of the water, forming a foam.

As used herein, the term "frothing" or "frothed" refers to a process of incorporating substantial volumes of air, or other gas, in a liquid where, in some embodiments, at least 10 volume percent of the frothed material consists of the gaseous component. In other embodiments, at least 30 volume percent of the frothed material consists of the gaseous component; at least 50 volume percent of the frothed material consists of the gaseous component; at least 70 volume percent of the frothed material consists of the gaseous component; at least 80 volume percent of the frothed material consists of the gaseous component; at least 85 volume percent of the frothed material consists of the gaseous component; and at least 90 volume percent in yet other embodiments. The liquid may be a molecular solution, a micellar solution, or a dispersion in an aqueous or organic medium. In general the frothed liquid is created by mechanical methods such as high shear mixing under atmospheric conditions or optionally injecting gas into the system while mixing. The term "froth" as used herein refers to an liquid which has been frothed, as described above, before drying or removing the liquid medium.

The term "foam" as used herein refers to a resilient structure formed by removing a substantial portion of the liquid medium from a froth. As the liquid medium is removed from the froth, the polymer forms a film, giving stability to the resulting structure. Film formation may depend upon variables including the inciting point of polymers within the froth, the rate of removal (i.e., evaporation rate) of the liquid medium, and overall froth composition, among others. For example, as water is removed from a froth formed from an aqueous dispersion, polymers contained in the dispersion may coalesce, fanning a film, giving structure and resiliency to the resulting foam. In some embodiments, a foam may be formed where the amount of residual liquid ranges from 0 to 20 weight percent; 0 to 10 weight percent in other embodiments; and 0 to 8 percent in yet other embodiments.

Embodiments of the foams disclosed herein may be open-cell foams. As used herein, "open-cell" means cells that are connected to each other, forming an interconnected network. Furthermore, an "open cell ratio" means a ratio of the volume of open cells to the total volume of cells in a foam.

Aqueous Dispersion

More generally, embodiments disclosed herein relate to aqueous dispersions and compounds made from aqueous dispersions that are mail in forming froths and foams that include flame retardants, phase change material, and combinations thereof. Dispersions used in embodiments disclosed herein include water, (A) at least one thermoplastic resin, and (B) a dispersion stabilizing agent. These are discussed in more detail below.

Thermoplastic Resin

The thermoplastic resin (A) included in embodiments of the aqueous dispersion of the present disclosure is a resin that is not readily dispersible in water by itself. The term "resin," as used herein, should be construed to include synthetic polymers or chemically modified natural resins.

Resins used in embodiments disclosed herein may include elastomers and blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some polymers useful in the dispersions have a single melting point while other polymers have more than one melting point.

In sortie polymers one or more of the melting points may be sharp such that all or a portion of the polymer melts over a fairly narrow temperature range, such as a few degrees centigrade. In other embodiments, the polymer may exhibit broad melting characteristics over a range of about 20° C. In yet other embodiments, the polymer may exhibit broad melting characteristics over a range of greater than 50° C.

Examples of the thermoplastic resin (A) which may be used in embodiments disclosed herein include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate and vinyl butyrate and the like; vinyl esters such as esters of monocarhoxylic acids, including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more. Examples of specific thermoplastic resins include styrene butadiene copolymers with a styrene content of from about 70 to about 95 weight percent.

As one suitable type of resin, the esterification products of a di- or poly-carboxylic acid and a dial comprising a diphenol may be used. These resins are illustrated in U.S. Pat. No. 3,590,000, which is incorporated herein by reference. Other specific example of resins include styrene/methacrylate copolymers, and styrene/butadiene copolymers; suspension polymerized styrene butadiencs; polyester resins obtained from the reaction of bisphenol A and propylene oxide followed by the reaction of the resulting product with fumaric acid; and branched polyester resins resulting from the reaction of dimethylterephthalate, 1,3-butanediol, 1,2-propanediol, and pentaerythritol, styrene acrylates, and mixtures thereof.

Further, specific embodiments employ ethylene-based polymers, propylene-based polymers, propylene-ethylene copolymers, and styrenic copolymers as one component of a composition. Other embodiments use polyester resins, including those containing aliphatic diols such as UNOXOL 3,4 diol available from The Dow Chemical Company (Midland, Mich.).

In selected embodiments, one component is formed from ethylene-alpha olefin copolymers or propylene-alpha olefin copolymers. In particular, in select embodiments, the thermoplastic resin comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions, and blends thereof, described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may also be suitable in some embodiments. In some embodiments, the blends may include two different Ziegler-Natta polymers. In other embodiments, the blends may include blends of a Ziegler-Natta and a metallocene polymer. In still other embodiments, the polymer used herein may be a blend of two different metallocene polymers. In other embodiments, single site catalyst polymers may be used.

In some embodiments, the polymer is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85 in one embodiment; greater than about 0.90 in another embodiment; greater than about 0.92 in another embodiment; and greater than about 0.93 in yet another embodiment. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the base polymer may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In one particular embodiment, the thermoplastic resin may comprise an alpha-olefin interpolymer of ethylene with a comonomer comprising an alkene, such as 1-octene. The ethylene and octene copolymer may be present alone or in combination with another thermoplastic resin, such as ethylene-acrylic acid copolymer. When present together, the weight ratio between the ethylene and octene copolymer and the ethylene-acrylic acid copolymer may range from about 1:10 to about 10:1, such as from about 3:2 to about 2:3. The polymeric resin, such as the ethylene-octene copolymer, may have a crystallinity of less than about 50%, such as less than about 25%. In some embodiments, the crystallinity of the polymer may range from 5 to 35 percent. In other embodiments, the crystallinity may range from 7 to 20 percent.

Embodiments disclosed herein may also include a polymeric component that may include at least one multi-block olefin interpolymer. Suitable multi-block olefin interpolymers may include those described in U.S. Provisional Patent Application No. 60/818,911, for example. The tem, "multi-block copolymer" or refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDT or $M_w/M_n$), block length distribution, and/or block number distribution clue to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block copolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer). In some embodiments, the copolymer is a multi-block interpolymer. In some embodiments, the multi-block interpolymer may be represented by the following formula:

$$(AB)_n$$

where n is at least 1, and in various embodiments n is an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 weight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block. A nor block B comprises two or more segments (or sub-blocks), such as a tip segment.

The multi-block interpolymers may be characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the multi-block interpolymer Obtained in preparative TREF, and $w_i$ is the weight percentage of the $i^{th}$ fraction.

Similarly, the square root of the second moment about the mean, hereinafter referred to as the second moment weight average block index, may be defined as follows:

$$2^{nd} \text{ moment weight average } BI = \sqrt{\frac{\Sigma(w_i(BI_i - ABI)^2)}{\frac{(N-1)\Sigma w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or }$$

$$BI = -\frac{LnP_X - LnP_{XO}}{LnP_A - LnP_{AB}}$$

where $T_X$ is the analytical temperature rising elution fractionation (ATREF) elution temperature for the $i^{th}$ fraction (preferably expressed in Kelvin), $P_X$ is the ethylene mole fraction for the fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$$Ln P_{AB} = \alpha/T_{AB} + \beta$$

where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. IF the calibration curve is obtained from similar molecular weight ranges, such effect would be essentially negligible. In some embodiments, random ethylene copolymers and/or preparative TREF fractions of random copolymers satisfy the following relationship:

$$Ln P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $Ln P_X = \alpha/T_{XO} + \beta$. Conversely, $P_{XO}$ is the ethylene mole fraction for a random copolymer of the same composition and having an ATREF temperature of $T_X$, which may be calculated from $Ln P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments. ABI is greater than about 0.4 and up to about 1.0. In yet other embodiments, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

Ethylene α-olefin multi-block interpolymers used in embodiments disclosed herein may be interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or non-conjugated dimes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. In certain embodiments, the α-olefins may be 1-Butene or 1-octene. Other suitable monomers include styrene, halo- or alkyl-substituted styrenes, vinylbenzocyclobutane, 1,4-hexadiene, 1,7-octadiene, and naphthenics (such as cyclopentene, cyclohexene, and cyclooctene, for example).

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Properties of infill may benefit from the use of embodiments of the multi-block interpolymers, as compared to a random copolymer containing the same monomers and monomer content, the multi-block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α olefin, optionally comprising a $C_4$-$C_{20}$ diene, may be used.

Suitable non-conjugated diene monomers may include straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dimes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norboniene (MNB), and dicyclopentadiene (DCPD).

One class of desirable polymers that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene; 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

In select embodiments, the thermoplastic resin is formed from ethylene-alpha olefin copolymers or propylene-alpha olefin copolymers. In particular, in select embodiments, the thermoplastic resin includes one or more non-polar polyolefins.

The olefin polymers, copolymers, interpolymers, and multi-block interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an olefin polymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of which are incorporated herein by reference in their entirety. One particularly useful functional group is maleic anhydride.

The amount of the functional group present in the functional polymer may vary. The functional group may be present in an amount of at least about 1.0 weight percent in some embodiments; at least about 5 weight percent in other embodiments; and at least about 7 weight percent in yet other embodiments. The functional group may be present in an amount less than about 40 weight percent in some embodiments; less than about 30 weight percent in other embodiments; and less than about 25 weight percent in yet other embodiments.

In certain embodiments, the thermoplastic resin may be an ethylene-octene copolymer or interpolymer having a density between 0.863 and 0.911 g/cc and melt index (190° C. with 2.16 kg weight) from 0.1 to 100 g/10 min. In other embodiments, the ethylene-octene copolymers may have a density between 0.863 and 0.902 g/cc and melt index (190° C. with 2.16 kg weight) from 0.8 to 35 g/10 min.

In certain embodiments, the thermoplastic resin may be a propylene-ethylene copolymer or interpolymer having an ethylene content between 5 and 20% by weight and a melt flow rate (230° C. with 2.16 kg weight) from 0.5 to 300 g/10 min. In other embodiments, the propylene-ethylene copolymer or interpolymer may have an ethylene content between 9 and 12% by weight and a melt flow rate (230° C. with 2.16 kg weight) from 1 to 100 g/10 min.

In certain other embodiments, the thermoplastic resin may be a low density polyethylene having a density between 0.911 and 0.925 g/cc and melt index (190° C. with 2.16 kg weight) from 0.1 to 100 g/10 min.

In other embodiments, the thermoplastic resin may have a crystallinity of less than 50 percent. In preferred embodiments, the crystallinity of the base polymer may be from 5 to 35 percent. In more preferred embodiments, the crystallinity may range from 7 to 20 percent.

In certain other embodiments, the thermoplastic resin is a semi-crystalline polymer and may have a melting point of less than 110° C. In preferred embodiments, the melting point may be from 25 to 100° C. in more preferred embodiments, the melting point may be between 40 and 85° C.

In other embodiments, the thermoplastic resin is a glassy polymer and may have a glass transition temperature of less than 110° C. In preferred embodiments, the glass transition temperature may be from 20 to 100° C. In more preferred embodiments, the glass transition temperature may be from 50 to 75° C.

In certain embodiments, the thermoplastic resin may have a weight average molecular weight greater than 10,000 g/mole. In other embodiments, the weight average molecular weight may be from 20,000 to 150,000 g/mole; in yet other embodiments, from 50,000 to 100,000 g/mole.

The one or more thermoplastic resins may be contained within the aqueous dispersion in an amount from about 1% by weight to about 96% by weight. For instance, the thermoplastic resin may be present in the aqueous dispersion in an amount from about 10% by weight to about 60% by weight, and about 20% to about 50% by weight in another embodiment.

Dispersion Stabilizing Agent

Embodiments disclosed herein use a stabilizing agent to promote the formation of a stable dispersion or emulsion. In select embodiments, the stabilizing agent may be a surfactant, a polymer (different from the thermoplastic resin or base polymer detailed above), or mixtures thereof. In other embodiments, the resin is a self-stabilizer, so that an additional exogenous stabilizing agent may not be necessary. For example, a self-stabilizing system may include a partially hydrolyzed polyester, where by combining polyester with an aqueous base, a polyester resin and surfactant-like stabilizer molecule may be produced. In particular, the stabilizing agent may be used as a dispersant, a surfactant for frothing the foam, or may serve both purposes. In addition, one or more stabilizing agents may be used in combination.

In certain embodiments, the stabilizing agent may be a polar polymer, having a polar group as either a comonomer or grafted monomer. In preferred embodiments, the stabilizing agent may include one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of Exxon-Mobil) and described in U.S. Pat. Nos. 4,599,392, 4,988,781, and 5,938,437, each of which is incorporated herein by reference in its entirety. Other suitable polymers include ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

If the polar group of the polymer is acidic or basic in nature, the stabilizing agent polymer may be partially or fully neutralized with a neutralizing agent to form the corresponding salt. In certain embodiments, neutralization of the stabilizing agent, such as a long chain fatty acid or EAA, may be from 25 to 200% on a molar basis; from 50 to 110% on a molar basis in other embodiments. For example, for EAA, the neutralizing agent is a base, such as ammonium hydroxide or potassium hydroxide, for example. Other neutralizing agents can include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Other stabilizing agents that may be used include long chain fatty acids or fatty acid salts having from 12 to 60 carbon atoms. In other embodiments, the long chain fatty acid or fatty acid salt may have from 12 to 40 carbon atoms.

Additional stabilizing agents that may be useful include cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful as a stabilizing agent may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the dispersing agent or stabilizing agent may be used in an amount ranging from greater than zero to about 60% by weight based on the amount of base polymer (or base polymer mixture) used. For example, long chain fatty acids or salts thereof may be used from 0.5 to 10% by weight based on the amount of base polymer. In other embodiments, ethylene-acrylic acid or ethylene-methacrylic acid copolymers may be used in an amount from 0.5 to 60% by weight based on the amount of the base polymer. In yet other embodiments, sulfonic acid salts may be used in an amount from 0.5 to 10% by weight based on the amount of base polymer.

As discussed above, more than one stabilizing agent may be used, and combinations may be used as a dispersant and as a surfactant, for example.

Dispersants

In one embodiment, the aqueous dispersion may include dispersant in an amount of more than about 1% by weight of the aqueous dispersion; more than about 2% in another embodiment; and more than about 3% in yet another embodiment. In another embodiment, the aqueous dispersion may include a dispersant agent in an amount less than about 10% by weight of the aqueous dispersion; less than about 8% in another embodiment; and less than 5% in yet another embodiment.

Suitable dispersants for the polyolefin resin particles may include salts of fatty acid(s) of carbon chain length of greater than 12 and preferably from 18 to 36 carbon atoms. The salts may be alkali metal or ammonium salts of the fatty acid, prepared by neutralization of the acid with the corresponding base, e.g., NaOH, KOH, and $NH_4OH$. These salts may be formed in situ in the dispersion step, as described more fully below. The appropriate fatty acid dispersant may be selected to serve as dispersant for the extrusion melt step in order to attain the desired average size of the particles, which in one embodiment is between, about 0.2 and 25 microns and between about 0.5 and 10 microns in another embodiment. In another embodiment, the polyolefin particles may range in size from 0.5 to 1.5 microns:

One of ordinary skill in the art will recognize that the dispersant used to create a relatively stable aqueous dispersion of polyolefin resin particles may vary depending on the nature of the polyolefin particles employed. Additionally, the dispersant used may be the same or different than the frothing surfactant used in the subsequent preparation of the troth.

Dispersion Formulations

Dispersion formulations in accordance with embodiments disclosed herein may include a liquid medium, such as water, a thermoplastic resin, a dispersion stabilizing agent, and optionally a filler. With respect to the autoplastic resin and the dispersion stabilizing agent, in some embodiments, the thermoplastic resin may comprise between about 30% to 99% (by weight) of the total amount of base polymer and dispersion stabilizing agent in the composition. In other embodiments, the thermoplastic resin may comprise between about 50% and about 80% (by weight) of the total amount of base polymer and dispersion stabilizing agent in the composition. In yet other embodiments, the thermoplastic resins may comprise about 70% (by Weight) of the total amount of base polymer and dispersion stabilizing agent in the composition.

In one embodiment, the aqueous dispersion disclosed herein may include polyolefin resin particles ranging in size from about 0.2 to 10 microns; from about 0.5 to 5 microns in another embodiment; and from about 1 to 2 microns. Thus, in comparison to the thermoplastic fibers mixed with the aqueous dispersion, the polyolefin resin particles are several orders of magnitude smaller than the fibers, discussed further below.

In a particular embodiment, the polyolefin resin may include copolymers and interpolymers of ethylene and/or propylene and other monomers selected from $C_4$ to $C_{10}$ olefins, preferably alpha-olefins, more preferably from $C_4$ to $C_8$ alpha-olefins and most preferably selected from n-butene, n-hexene and n-octene. The ethylene or propylene content of the resin may range from about 2 to 98 weight percent of the polyolefin particles. Where a softer, more flexible foam may be desired, a primarily ethylene-based polyolefin may be selected in which ethylene comprises from about 98 to 50 weight percent of the polyolefin. Where a stiffer foam of greater flexural modulus may be desired, a primarily propylene-based or other polyolefin May be selected in which propylene comprises from about 98 to 50 percent of the polyolefin. Selected comonomer(s) may comprise the remainder of the polyolefin.

In one embodiment, the polyolefin resin may include an ethylene-based polyolefin which has a melt index ("MI") determined according to ASTM D1238 (190° C. with a 2.16 kg weight) from about 0.1 to 25 g/10 min; from 0.25 to 22 g/10 min in another embodiment; and from about 0.5 to 18 g/10 min in yet another embodiment. In another embodiment, the polyolefin resin may include a propylene-based polyolefin which has a Melt Flow Rate ("MFR") determined according to ASTM D1238 (230° C. with 2.16 kg weight) of from about 0.25 to 85 g/10 min; from about 0.7 to 70 g/10 min in another embodiment; from about 1.4 to 60 in yet another embodiment; and from about 2 to 50 g/10 min in yet another embodiment.

In one embodiment, the polyolefin resin may comprise an ethylene-based polyolefin having a density ranging from about 0.845 to 0.925 g/cc; from about 0.85 to 0.91 in another embodiment; from about 0.855 to 0.905 in yet another embodiment; and from about 0.86 to 0.90 in yet another embodiment.

One class of polyolefins particularly suited for use herein are copolymers of ethylene and 1-octene or 1-butene, where ethylene comprises from about 50 to 90 percent by weight of the copolymer in one embodiment, and from about 55 to 85 percent by weight of the copolymer in another embodiment and 1-octene or 1-butene comprises from about 10 to 50 percent by weight of the copolymer in one embodiment and from about 15 to 45 percent by weight of the copolymer in another example, and where the ethylene copolymer has a Melt Index ranging from about 0.25 to 30 g/10 min in one embodiment, and 0.5 to 20 g/10 min in another embodiment.

Another preferred class of polyolefins includes copolymers of 1-propene and ethylene, 1-octene, 1-hexene or 1-butene, where 1-propene comprises from about 65 to 95 percent by weight of the copolymer in one embodiment in one embodiment, and from about 75 to 93 percent by weight of the copolymer in another embodiment and ethylene, 1-octene, 1-hexene or 1-butene comprise from about 5 to 35 percent by weight of the copolymer in one embodiment, and from about 7 to 25 percent by weight of the copolymer in another embodiment, and wherein the copolymer has a Melt Flow ranging from about 0.7 to 85 g/10 min in one embodiment and from about 1.4 to 55 g/10 min in another embodiment.

The thermoplastic resin and the dispersion stabilizing agent, are preferably dispersed in a liquid medium, which in some embodiments is water. In some embodiments, sufficient base is added to neutralize the resultant dispersion to achieve a pH range of about 6 to about 14. In particular embodiments, sufficient base is added to maintain a pH between about 9 to about 12. Water content of the dispersion may be controlled so that the combined content of the thermoplastic resin and the dispersion stabilizing agent (solids content) is between about 1% to about 74% (by volume). In another embodiment, the solids content ranges between about 25% to about 74% (by volume). In yet another embodiment, the solid content ranges between about 30% to about 50% (without filler, by weight). In yet another embodiment, the solids content ranges is between about 40% to about 55% (without filler, by weight).

Dispersions formed in accordance with embodiments disclosed herein may be characterized in having an average particle size of between about 0.3 to about 3.0 microns. In other embodiments, dispersions may have an average particle size of from about 0.8 to about 1.2 microns. "Average particle size" as used herein means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes or the particle. Particle sizes can be measured on a Beckman-Coulter LS230 laser-diffraction particle size analyzer or other suitable device.

In a specific embodiment, a thermoplastic resin, a stabilizing agent, and a filler are melt-kneaded in an extruder along with water and a neutralizing agent, such as ammonia, potassium hydroxide, or a combination of the two to form a dispersion compound. Those having ordinary skill in the art will recognize that a number of other neutralizing agents may be used. In some embodiments, the filler may be added after blending the base polymer and stabilizing agent.

Any melt-kneading means known in the art may be used. In some embodiments, a kneader, a rotostator, a BANBURY® mixer, single-screw extruder, or a multi-screw extruder is used. A process for producing the dispersions in accordance with embodiments disclosed herein is not particularly limited. One preferred process, for example, is a process comprising melt-kneading the above-mentioned components according to U.S. Pat. No. 5,756,659 and U.S. Patent Publication No. 20010011118.

FIG. 1 schematically illustrates an extrusion apparatus that may be used in forming dispersions used herein. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Frothing Surfactants

Embodiments disclosed herein may use a surfactant to facilitate or promote the formation of a stable froth and to aid in frothing. Creating and stabilizing the froth during the frothing and drying steps may be accomplished by addition of a frothing surfactant to the aqueous dispersion of the polyolefin resin when initially creating the froth. In addition, these surfactants may also be used to improve aqueous wetting of dried foams, if desired. Suitable frothing surfactants may be selected from cationic, nonionic and anionic surfactants. In one embodiment, an anionic surfactant may be used.

In some embodiments, the frothing surfactant may be an alkylcellulose ethers, hydroxyalkyl cellulose ethers, hydroxyalkyl alkylcellulose ethers, guar gum, xanthan gum, and polyoxyethylene resins of at least 20,000 molecular weight, or combinations thereof. Other suitable frothing surfactants may be selected from cationic surfactants, anionic surfactants, or a non-ionic surfactants. Examples of cationic surfactants include quaternary amines, primary amine salts, diamine salts, and ethoxylated amines. Examples of non-ionic surfactants include block copolymers containing ethylene oxide, silicone surfactants, alkylphenol ethoxylates, and linear and secondary alcohol ethoxylates of alkyl group containing more than 8 carbon atoms.

Examples of anionic surfactants include sulfonates, carboxylates, and phosphates. In one embodiment, anionic surfactants useful in preparing the froth from the aqueous dispersion may be selected from carboxylic acid salts and ester amides of carboxylic fatty acids, preferably fatty acids comprising from 12-36 carbon atoms, e.g., stearic or lauric acid, palmitic, myristic, oleic, linoleic, ricinoleic, erucic acid and the like.

In some embodiments, the surfactant may include amphoteric surfactants such as aminopropionates, amphoteric sulfonates, betaines, imidazoline based amphoterics, and sultaines, among others. For example, the surfactant may be derived from an imidazoline and can either be the acetate form (containing salt) or the propionate form (salt-free). Examples of suitable amphoteric surfactants include surfactants such as lauramidopropyl betaine, sodium laurimino dipropionate, cocoamidopropyl hydroxyl sultaine, alkylether hydroxypropyl sultaine, sodium capryloampho hydroxypropyl sulfonate, disodium capryloampho dipropionate, sodium cocoamphoacetate, disodium cocoamphodiacetate, sodium cocoamphopropionate, disodium octyl iminodipropionate, sodium cocoampho hydroxypropyl sulfonate, disodium lauryl iminodipropionate, sodium stearoampho acetate, and disodium tallow iminodipropionate, among others. Other amphoteric surfactants known in the art may also be used.

Surfactants useful as a stabilizing agent may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In one embodiment, when a good "hand" or fabric-like feel is desired in the finished foam, a saturated fatty acid derivative (e.g., the salt of stearic or palmitic acid) may be used. Other suitable anionic surfactants include alkylbenzene sulfonates, secondary n-alkane sulfonates, alpha-olefin sulfonates, dialkyl diphenylene oxide sulfonates, sulfosuccinate esters, isothionates, linear alkyl (alcohol) sulfates and linear alcohol ether sulfates. It is understood that the frothing surfactants may or may not be different than those used to prepare the dispersion. These surfactants serve both to assist in froth formation and help to stabilize the froth. In a particular embodiment, the surfactant may be selected from at least one of alkali metal, mono-, di- and tri-alkanol (mono-, di- or triethanol) amine, and ammonium salts of lauryl sulfate, dodecylbenzene sulfates, alcohol ethoxy sulfates, and isothionates, the dibasic salt of N-octyldecylsulfosuccinimate, and mixtures thereof.

In some embodiments, the frothing surfactant may be used in an amount such that the resulting froth, as described below, may contain from 0.01 to 10.0 weight percent frothing surfactant based on the dry weight of the thermoplastic polymer. In other embodiments, the froth may contain from 0.02 to 3.0 weight percent frothing surfactant based on the dry weight of the thermoplastic polymer; from 0.03 to 2.5 weight percent based on the dry weight of the thermoplastic polymer in other embodiments; and from 0.05 to 10.0 weight percent based on the dry weight of the thermoplastic polymer in yet other embodiments. In various other embodiments, the frothing surfactant may be present in the froth in an amount ranging from a lower bound of 0.01, 0.02, 0.03, 0.04, or 0.05 weight percent based on the dry weight of the thermoplastic polymer to an upper bound of 2.0, 2.5, 3.0, 4.0, 5.0, or 10.0 weight percent based on the dry weight of the thermoplastic polymer, in any combination of given upper and lower bounds.

Flame Retardants

Embodiments of the dispersions, froths, and foams disclosed herein may use flame retardants or intumescents, or any combination thereof, in the formulation to reduce flammability of materials onto which the dispersions, froths, or foams are deposited. Flame retardants are materials that slow the advancement of flame or fire. Flame retardant additives may comprise any combination of inorganic salts, metal oxides or hydroxides, halogenated compounds, phosphate compounds, borate compounds, and melamine compounds. In one embodiment aluminum hydroxide or magnesium hydroxide or the corresponding metal oxides may be used as a bulk tiller flame retardant material. In a further embodiment, melamine compounds may be used in combination with other flame retardants to provide an intumescent effect. In yet another embodiment, halogenated compounds such as chlorinated paraffins, halogenated phosphate esters, or halogen-containing polymers may be used. In still another embodiment phosphorus containing flame retardants may be used such as phosphoric esters, halogen-containing phosphoric esters, phosphorus containing polyols, or polymers of vinyl phosphonates. In yet another embodiment, nitrogen containing intumescents and other flame retardants as disclosed in U.S. Patent Publications 2003/0207969, 2004/0097620, 2004/0116565, and 2004/0138351, each of which are incorporated by reference, may be used.

In some embodiments, the flame retardant may be used in an amount such that the resulting froth, as described below, may contain from 15 to 75 weight percent flame retardant based on the total weight of the thermoplastic resin, the stabilizing agent, and the flame retardant. In other embodiments, the froth may contain from 20 to 70 weight percent flame retardant based on the total weight of the thermoplastic resin, the stabilizing agent, and the flame retardant; from 25 to 65 weight percent based on the total weight of the thermoplastic resin, the stabilizing agent, and the flame retardant in other embodiments; and from 30 to 50 weight percent based on the total weight of the thermoplastic resin, the stabilizing agent, and the flame retardant in yet other embodiments. In various other embodiments, the flame retardant may be present in the troth in an amount ranging from a lower hound of 10, 15, 20, 25, or 30 weight percent based on the total weight of the thermoplastic resin, the stabilizing agent, and the flame retardant to an upper bound of 50, 55, 60, 65, or 70 weight percent based on the total weight of the thermoplastic resin, the stabilizing agent, and the flame retardant, in any combination of given upper and lower hounds.

In some embodiments, the flame retardant may be used in an amount such that the resulting foam, as described below, may contain from 5 to 80 weight percent flame retardant. In other embodiments, the foam may contain from 5 to 70 weight percent flame retardant; from 20 to 70 weight percent in other embodiments; from 25 to 65 weight percent in other embodiments; and from 30 to 50 weight percent in yet other embodiments. In various other embodiments, the flame retardant may be present in the foam in an amount ranging from a lower bound of 5, 10, 15, 20, 25, or weight percent to an upper bound of 50, 55, 60, 65, or 70 weight percent, in any combination of given upper and lower bounds.

Phase Change Materials

Dispersions, froths, and foams disclosed herein may include phase change materials. In some embodiments, phase change materials may include encapsulated or microencapsulated waxes, salt hydrides, fatty acids and esters, and paraffins. Phase change materials may absorb or release heat due to a phase change when the temperature of the phase change material increases above or decreases below a particular temperature, respectively. For example, if the temperature exceeds the melting point of a wax, the encapsulated wax melts and absorbs the excess heat; conversely, if the temperature falls, the encapsulated wax becomes solid again and releases heat. One example of a phase change material is MICRONAL®, available from BASF. In some embodiments, a phase change material may undergo a phase change at a temperature of approximately 0° C. The temperature at which the phase change material undergoes a phase change may be referred to as the switching temperature. In various other embodiments, a phase change material may have a switching temperature between 0° C. and 100° C. In other embodiments, a phase change material may have a switching temperature of approximately 25° C. In various other embodiments, a phase change material may have a switching temperature of about 0° C. or higher, about 10° C. or higher, about 20° C. or higher, about 25° C. or higher, or about 35° C. or higher.

The switching temperature of the phase change material used in various embodiments may depend upon the environment for which the phase change material will be exposed. For example, articles for use in tropical environments may have a phase change materials having a higher switching temperature than articles for use in moderate or arctic environments due to the relative temperatures at which heating and cooling may be desired.

In some embodiments, the phase change material may be used in an amount such that the resulting foam, as described below, may contain from 5 to 80 weight percent phase change material. In other embodiments, the foam may contain from 5 to 70 weight percent phase change material; from 20 to 70 weight percent in other embodiments; from 25 to 65 weight percent in other embodiments; and from 30 to 50 weight percent in yet other embodiments. In various other embodiments, the phase change material may be present in the foam in an amount ranging from a lower hound of 5, 10, 15, 20, 25, or 30 weight percent to an upper bound of 50, 55, 60, 65, or 70 weight percent, in any combination of given upper and lower bounds.

Additives

The foam may optionally contain tiller materials in amounts, depending on the application for which they are designed, ranging from about 2-100 percent (dry basis) of the weight of the thermoplastic resin and dispersion stabilizing agent. These optional ingredients may include, for example, calcium carbonate, titanium dioxide powder, polymer particles, hollow glass spheres, polymeric fibers such as polyolefin based staple monofilaments, further intumescents, further flame retardants, and the like. In foams designed for use in flame retardant applications additives and flame retardants may beneficially be added directly to the particle dispersion before frothing is initiated. In other embodiments, the dispersions, froths, and foams disclosed herein may include fibrils or fiber-like materials, such as natural or synthetic fibers, such as disclosed in U.S. Provisional Patent Application Ser. No. 60/818,911.

When fibrils or fiber-like materials and dispersions are combined, frothed, and dried to form a foam, a fibrillated structure may result. The foam morphology may be characterized as having a high degree of randomness and larger surface openings as compared to traditional polyolefin froth foams. The internal structure of the foam may also display a non-cellular architecture with non-woven fibrils and larger void spaces relative to conventional polyolefin froth foams. In one embodiment, the absorbent structure (the foam) may have a non-cellular, fibrillated morphology. As used herein, a "non-cellular, fibrillated structure" refers to a foam having an open, random, non-cellular, morphology composed of or having fibrils or thread-like filaments. The non-cellular, fibrillated structure, for example, may be non-uniform and non-repeating, such as where the fibrils form a non-woven fibrous-like web and where a majority of the struts are not interconnected.

Froth Preparation

A froth may be prepared from the dispersion/surfactant/flame retardant mixture by using a mechanical method such as a high shear, mechanical mixing process under atmospheric conditions to entrain air or other gases in the aqueous phase of the dispersion or optionally injecting gas into the system while mixing. In other embodiments, a froth may be prepared from the dispersion/surfactant/phase change material mixture. The amount of air or other gas (where a gas in addition to or other than air is desirable) that may be incorporated in the froth may comprise at least 30% by volume in one embodiment, at least 80% by volume in another embodiment, at least 85% by volume in another embodiment, and at least 90% by volume of the resultant froth in yet another embodiment. Initially, all components to be used in making the froth may be mixed together with mild agitation to avoid entrapping air. In some embodiments, the flame retardant and/or phase change material may be added to the dispersion mixture prior to frothing. In other embodiments, the flame retardant and/or phase change material may be added to the mixture after frothing. In other embodiments, the flame retardant and/or phase change material may be added during frothing.

In some embodiments, components of the froth may include (a) a thermoplastic resin; (b) water, (c) at least one frothing surfactant, (d) a gas, and (e) at least one flame retardant and/or at least one phase change material. The froth may be formed from these components, where the froth comprises from about 15 to 75 weight percent component (a), from about 25 to 75 weight percent component (b), from about 0.1 to 10 weight percent component (e), from about 5 to 50 weight percent component (c), and wherein (d) is present in an amount such that (d) comprises at least 30 percent of the total volume of all components present in the froth.

Once all of the ingredients are well mixed, the mixture may be exposed to high shear mechanical mixing. During this step, the bulk viscosity of the mixture may increase as more air is entrapped within the continuous aqueous phase until a non-flowable, stiff froth is formed. The mixing time necessary to obtain a froth with the desired density may vary with amount and type of frothing surfactant and the amount of mechanical shear. Any mechanical mixing device capable of whipping air into a thickened aqueous dispersion, such as a kitchen blender/hand mixer, Hobart mixer fitted with a wire whip, a rotostator, or on a larger scale, a Cowie-Riding Twin Foamer (Cowie Riding Ltd.) may be used. The commercial foamers may also allow one to inject air into their high shear mixing head to obtain very low (less than 50 g/L) density froth.

Froth density may be measured, for example, by drawing off samples of the froth in cups of predetermined volume and weight, weighing the froth-filled cup and then calculating the density of the sample. In commercial frothers, air can be added directly into the mixing head to assist in development of low density froth. The speed of the frothing device may be increased or decreased to attain a desired froth density. In one embodiment, the froth density may be in a range of about 0.04 to 0.45 g/cc, from about 0.04 to 0.15 g/cc in another embodiment, from about 0.05 to 0.10 g/cc in another embodiment, and from 0.07 to 0.08 g/cc in yet another embodiment. Once a desired density of the froth is obtained, the froth may be optionally spread on a substrate prior to conversion of the froth into a foam. In other embodiments, the froth density may be in a range from about 0.02 g/cc to about 0.7 g/cc. The density of the froth, as detailed above, is on a wet basis.

Froths and foams comprising the polymers may also be formed as disclosed in PCT application No. PCT/US2004/027593, filed Aug. 25, 2004, and published as WO2005/021622, incorporated by reference herein. In other embodiments, the polymers may also be crosslinked by any known means, such as the use of peroxide, electron beam, silane, azide, gamma irradiation, ultraviolet radiation, or other crosslinking techniques. The polymers may also be chemically modified, such as by grafting (for example by use of maleic anhydride (MAH), silanes, or other grafting agent), halogenation, amination, sulfonation, or other chemical modification.

Drying and Recovery Steps

In one embodiment, the foam may be prepared from the froth by removing at least a portion of the liquid/aqueous element of the froth prepared as disclosed herein. In other embodiments, the foam may be prepared from the froth by removing at least a majority, i.e. greater than 50 weight percent, of the liquid/aqueous element of the froth. In yet other embodiments, the foam may be prepared by removing substantially all of the liquid/aqueous element. In various embodiments, greater than 30 weight percent, greater than 50 weight percent, greater than 80 weight percent, greater than 90 weight percent, greater than 95 weight percent, greater than 98 weight percent, or greater than 99 weight percent of the liquid/aqueous element may be removed. The means by which the liquid portion is removed may be selected to minimize the amount of froth volume collapse. In one embodiment, the froths may be dried and converted to foams by heating in a forced air drying oven, at temperatures selected for optimum drying. In one embodiment, the froth may be heated to a temperature between about 60° C. and 120° C. (between about 140° F. and 250° F.).

As the nature of the thermoplastic resin permits, processing may be conducted at the highest temperature feasible to remove water as rapidly as possible from the froth without destroying the viscosity of the polyolefin resin particles on the surface of the bubbles of the froth or causing significant (e.g., more than 30 volume percent) collapse of the partially dried froth. In one embodiment, it may be desirable to dry the froth at a temperature that approaches, but does not exceed the melting range of the thermoplastic resin. In another embodiment, it may be desirable to attain a temperature where the amorphous regions in the thermoplastic resin begin to coalesce to avoid or at least minimize collapse of the froth before the foam has become fully "dried" in its ultimate form and dimension and at least 95 weight percent of the water in the froth has been driven out. The resulting "dried" foam may have a density of about 0.02 to 0.07 g/cm$^3$ in one embodiment, and from about 0.03 to 0.05 g/cm$^3$ in another embodiment. In other embodiments, the foam may have a density between 0.02 g/cm$^3$ and 0/30 g/cm$^3$. The foam density, as detailed above, is on a dry basis, exclusive of any water that may be present in the foam.

Some embodiments of the dried foam may have an average thickness ranging from 0.01 cm to 2.5 cm. Other embodiments of the dried foam may have an average thickness ranging from 0.05 cm to 2.0 cm; and from 1 to 1.5 cm in yet other embodiments. Articles comprising embodiments of the dried foam may include at least one layer of foam having an average thickness ranging from 0.1 cm to 2.5 cm; from 0.5 cm to 2.0 cm in other embodiments; and from 1.0 cm to 1.5 cm. In yet other embodiments. In some embodiments, two or more foams may be laminated together; in various embodiments, the two or more foams may have the same or different densities, the same or different cell sizes, or the same or different structures (open-celled, closed celled, etc.). In other embodiments, one or more foams may be laminated to a substrate, such as film. In some embodiments, a substrate may be coated with a froth, where the coating may be performed with or without an adhesive.

Drying of the froth to form the desired foam may be conducted in batch or continuous mode. Devices including, for example, conventional forced air drying ovens or banks of infrared heating lamps or dielectric heating devices, e.g., radio (typically operated at permitted frequency bands in the range between 1-100 MHz) and microwave (typically operated at permitted frequency bands in the range between 400 to 2500 MHz) frequency energy generating sources, lining a tunnel or chamber in which the froth may be placed or conveyed through, in a continuous fashion, may be employed for drying. A combination of such drying energy sources may be used, either simultaneously or sequentially applied, to dry froth to form foam. In one embodiment, the drying includes the simultaneous use of a dielectric device and a forced air drying oven. For foam having a thickness of about 0.25-0.6 cm, the drying may be achieved as quickly as 45-90 seconds when the forced air oven is operated at approximately 75° C. and a radio frequency generator heats the froth to an internal temperature of about 45-50° C. The temperature of the drying operation may be selected according to the nature and the melting range of the polyolefin resin particles (as determined by DSC) employed to prepare the foam. The dielectric heating frequency bands, permitted for industrial use in various countries, are designated in greater detail in the reference "Foundations of Industrial Applications of Microware and Radio Frequency Fields", Rousy, G and Pierce, J. A. (1995).

In some embodiments, the resulting foam may be an open-cell foam. In certain embodiments, the cell size of the majority of cells of the foam may range between about 1 and 3000 microns; between about 5 and 1000 microns in other embodiments; and between 10 and 500 microns in yet other embodiments. In some embodiments, the open-cell foam may have an open-cell ratio of greater than 65%. In other embodiments, the open-cell foam may have an open-cell ratio of greater than 75%; greater than 85% in other embodiments; and greater than 95% in yet other embodiments.

The flammability of the resulting foam may be lower than the flammability of a non-flame retardant control sample. In some embodiments, the foam may have a burn length of 80% or lower than a non-flame retardant control sample according to ASTM D4986 Standard Test Method for Horizontal Burning Characteristics of Cellular Polymeric Materials. ASTM D4986 is a test method to determine the relative rate of burning and the extent and time of burning of cellular polymeric materials. In other embodiments, the foam may have a burn length of 70% or lower than a non-flame retardant control sample according to ASTM D4986; 60% or lower in other embodiments; and 50% or lower in yet other embodiments. In other embodiments, the resulting foam may be self-extinguishing.

In some embodiments, the foams disclosed herein may specifically find use in a fire barrier, absorbent articles, sound deadening materials, thermal insulating materials (such as a thermal insulation layer in clothing), packaging materials, an odor absorber, a perfume carrier, padding material or other applications where foams may be useful. In other embodiments, a flame retardant article such as upholstered furniture, bedding, a mattress, automotive carpeting or seating, curtains, draperies, carpet, or other articles may be made from a laminated structure formed from the above described dispersions, froths, and/or foams.

In other embodiments, a substrate may be coated with at least one layer of the above described froth. In other embodiments, the above described foam may be used to form a flame retardant article. The flame retardant article can include a fabric and a flame retardant, open-cell foam, as described above, disposed on the fabric, where the foam layer and the fabric layer may be fused without an adhesive or where the foam may be at least partially impregnated in the fabric.

In still other embodiments, a laminate may be formed where at least one layer of the above described froth is disposed (i.e. laid, doctored, or spread) on at least one substrate. The at least one substrate may be a froth, a foam, a thermoplastic sheet or film, a woven or non-woven fabric, fiberglass, or a melt spun-bonded or melt blown material.

In some embodiments, a laminate may be formed where at least one layer of the above described foam is adhered to at least one substrate. The at least one substrate may be a froth, a foam, a thermoplastic sheet or film, a woven or non-woven fabric, fiberglass, or a melt spun-bonded or melt blown material. The foam layer may have a density different than that of the substrate. In other embodiments, the laminated structure may include a first and a second foam layer, where the density of the first and second foam layers may be the same or different. In other embodiments, the froths or foams disclosed herein may be disposed between two substrate layers, which may be the same or different substrates.

EXAMPLES

Example 1

Foam and Froth Preparation

A blend of 108.6 grams of an aqueous dispersion having a composition of 49% water, 48.75% copolymer of ethylene/1-octene content of 62/38 percent (ENGAGE® 8200 elastomer, available from The Dow Chemical Company), 1.02% UNICID® 350 (a mono-acid available from Baker-Petrolite Corp., Cincinnati, Ohio, of the formula $CH_3(CH_2)_nCOOH$, wherein n has an average value of about 23), 0.51% HYSTRENE® 4516 (stearic acid available from Chemtura Corporation), 0.51% STEPHANOL WAT-K (Tea Lauryl Sulfate, commercially available from Stepan Chemical Company, Northfield, Ill.), 0.18% METHOCEL® E4MP (methyl cellulose derivative commercially available from The Dow Chemical Company, Midland, Mich.), and 0.026% DOWICIL® 200 (a biocide commercially available from The Dow Chemical Company, Midland, Mich.) is mixed with 24.9 grams of water, and 35.1 grams of MARTINAL® OL-104G (aluminum hydroxide available from Albemarle Corporation) in a plastic container. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The froth is spread onto the back of a 100% olefin upholstery fabric having a fabric weight of 292 g/m² and is smoothed to a height of 0.25 inches (6.4 mm). The froth is placed in a Blue M forced air oven at drying temperature of approximately 75° C. for 25 minutes. The resulting final foam height after drying is measured to be about 3.7 mm. The resulting final foam/fabric structure has a foam weight of 613 g/m² and a foam density of about 0.165 g/cm³. The resulting final foam has a composition of 38.8% MARTINAL® OL-104G and 61.2% dispersion solids.

When tested for horizontal burn performance using ASTM D4986 Standard Test Method for Horizontal Burning Characteristics of Cellular Polymeric Materials, the foam/fabric sample gives a burn length of 3.5 cm after 3 minutes elapsed time.

Comparative Example 1

Approximately 100 grams of an aqueous dispersion having a composition of 49% water, 48.75% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_nCOOH$, wherein n has an average value of about 23), 0.51% HYSTRENE® 4516 (stearic acid available from Chemtura Corporation), 0.51% STEPHANOL WAT-K (Tea Lauryl Sulfate, commercially available from Stepan Chemical Company, Northfield, Ill.), 0.18% METHOCEL® E4MP (methyl cellulose derivative commercially available from The Dow Chemical Company, Midland, Mich.), and 0.026% DOWICIL® 200 (a biocide commercially available from The Dow Chemical Company, Midland, Mich.) is placed in a conventional mixing bowl under a Hobart-type stand mixer fitted with a wire beater. The blend is mixed on high speed for 3 minutes thereby entraining air and producing a froth.

The froth is spread onto the back of a 100% olefin upholstery fabric having a fabric weight of 292 g/m$^2$ and is smoothed to a height of 0.25 inches (6.4 mm). The froth is placed in a Blue M forced air oven at drying temperature of approximately 75° C. for 25 minutes. The resulting final foam height after drying is measured to be about 4.1 mm. The resulting final foam/fabric structure has a foam weight of 238 g/m$^2$ and a foam density of about 0.058 g/cm$^3$.

When tested for horizontal burn performance using ASTM D4986 Standard Test Method for Horizontal Burning Characteristics of Cellular Polymeric Materials, the foam/fabric sample gives a burn length of 10.5 cm after 3 minutes elapsed time.

The burn length of the foam of Example 1, foamed from a dispersion-flame retardant mixture, was only 3.5 cm. Comparatively, the burn length of the loam of Comparative Example 1, formed from a dispersion similar to that used in Example 1 without a flame retardant mixture, was 10.5 cm.

Example 2

A blend of 75.47 grams of an aqueous dispersion having a composition of 48.7% water, 49.05% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula CH$_3$(CH$_2$)$_n$COOH, wherein n has an average value of about 23), 1.02% HYSTRENE® 4516 (stearic acid available from Chemtura Corporation), 0.17% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with 14.53 grams of water, and 40.00 grams of MELAPUR® MC XL (melamine cyanurate available from Ciba Specialty Chemicals Corporation) in a plastic container. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The froth is spread onto the back of a 69.5% cotton/30.5% polyester mattress ticking having a fabric weight of 217 g/m$^2$ and is smoothed to a height of 0.25 inches (6.4 mm). A polypropylene non-woven fabric having a weight of 18.3 g/m$^2$ is laid on top of the smoothed froth. The froth is placed in a Blue M forced air oven at a drying temperature of approximately 75° C. for 60 minutes. The resulting final foam height after drying is measured to be about 5.93 mm. The resulting final foam/fabric structure has a foam weight of 559 g/m$^2$ and a foam density of about 0.094 g/cm$^3$. The resulting final foam has a composition of 50.6% MELAPUR® MC XL and 49.4% dispersion solids.

When tested for horizontal burn performance using ASTM D4986 Standard Test Method for Horizontal Burning Characteristics of Cellular Polymeric Materials, the foam/fabric sample gives a burn length of 4.2 cm after 3 minutes elapsed time and is self extinguishing.

Example 3

A blend of 79.28 grams of an aqueous dispersion having a composition of 48.7% water, 49.05% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula CH$_3$(CH$_2$)$_n$COOH, wherein n has an average value of about 23), 1.02% HYSTRENE® 4516 (stearic acid available from Chemtura Corporation), 0.17% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with 31.54 grams of water, and 75.89 grams of MELAPUR® MC XL (melamine cyanurate available from Ciba Specialty Chemicals Corporation) in a plastic container. The mixture is shaken and homogenized using a household high Shear hand held mixer (Hamilton Beach TURBO-TWISTER™). The mixture is placed in a conventional mixing howl under a Hobart-type stand mixer fitted with a wire beater. The blend is mixed on high speed for 3 minutes thereby entraining air and producing a froth.

The froth is spread onto the back of a 100% polyester mattress ticking having a fabric weight of 100 g/m$^2$ and is smoothed to a height of 0.25 inches (6.4 mm). A polypropylene non-woven fabric having a weight of 18.3 g/m$^2$ is laid on top of the smoothed froth. The froth is placed in a Blue M forced air oven at drying temperature of approximately 75° C. for 50 minutes. The resulting final foam height after drying is measured to be about 5.32 mm. The resulting final foam/fabric structure has a foam weight of 1026 g/m$^2$ and a foam density of about 0.193 g/cm$^3$. The resulting final foam has a composition of 65.1% MELAPUR® MC XL and 34.9% dispersion solids.

Example 4

A blend of 116.45 grams of an aqueous dispersion having a composition of 49% water, 48.75% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula CH$_3$(CH$_2$)$_n$COOH, wherein n has an average value of about 23), 0.51% HYSTRENE® 4516 (stearic acid available from Chemtura Corporation), 0.51% STEPHANOL WAT-K (Tea Lauryl Sulfate, commercially available from Stepan Chemical Company, Northfield, Ill.), 0.18% METHOCEL® E4MP (methyl cellulose derivative commercially available from The Dow Chemical Company, Midland, Mich.), and 0.026% DOWICIL® 200 (a biocide commercially available from The Dow Chemical Company, Midland, Mich.) is mixed with 13.9 grams of water, and 33.25 grams of MAGNIFIN® H-5MV (magnesium hydroxide available from Albemarle Corporation) in a plastic container. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The froth is spread onto the back of a 100% olefin upholstery fabric having a fabric weight of 292 g/m$^2$ and is smoothed to a height of 0.25 inches (6.4 mm). The froth is placed in a Blue M forced air oven at drying temperature of approximately 75° C. for 25 minutes. The resulting final foam height after drying is measured to be about 3.5 mm. The resulting final foam/fabric structure has a foam weight of 813 g/m² and a foam density of about 0.232 g/cm³. The resulting final foam has a composition of 35.8% MAGNIFIN® H-5MV and 64.2% dispersion solids.

When tested for horizontal burn performance using ASTM D4986 Standard Test Method for Horizontal Burning Characteristics of Cellular Polymeric Materials, the foam/fabric sample gives a burn length 014.0 cm after 3 minutes elapsed time.

Example 5

A blend of 179.89 grams of an aqueous dispersion having a composition of 49% water, 48.75% copolymer of ethylene/ 1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_n$ COOH, wherein n has an average value of about 23), 0.5.1% HYSTRENE® 4516 (stearic acid available from Chemtura Corporation), 0.51% STEPHANOL WAT-K (Tea Lauryl Sulfate, commercially available from Stepan Chemical Company, Northfield, Ill.), 0.18% METHOCEL® E4MP (methyl cellulose derivative commercially available from The Dow Chemical Company, Midland, Mich.), and 0.026% DOWICIL® 200 (a biocide commercially available from The Dow Chemical Company, Midland, Mich.) is mixed with 37.0 grams of water, and 24.27 grams of EXOLIT® AP-760 (a non-halogenated flame retardant based on ammonium polyphosphate and nitrogen available from Clariant Corporation) in a plastic container. The mixture is shaken and homogenized using a household high shear hand held mixer (Hamilton Beach TURBO-TWISTER™). The mixture is placed in a conventional mixing bowl under a Hobart-type stand mixer titled with a wire beater. The blend is mixed on high speed for 3 minutes thereby entraining air and producing a froth.

The froth is spread onto the back of a 69.5% cotton/30.5% polyester mattress ticking having a fabric weight of 217 g/m² and is smoothed to a height of 0.25 inches (6.4 mm). The froth is placed in a Blue M forced air oven at drying temperature of approximately 75° C. for 25 minutes. The resulting final foam height after drying is measured to be approximately 4.47 mm. The resulting final foam/fabric structure has a foam weight of 1253 g/m² and a foam density of about 0.280 g/cm³. The resulting final foam had a composition of 20.9% EXOLIT® AP-760 and 79.1% dispersion solids.

When tested for horizontal burn performance using ASTM D4986 Standard Test Method for Horizontal Burning Characteristics of Cellular Polymeric Materials, the foam/fabric sample gives a burn length of 3.0 cm after 3 minutes elapsed time and is almost self extinguishing.

Examples 6, 7, 8

A blend of an aqueous dispersion having a composition of 48.7% water, 49.06% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_n$COOH, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical. Company, Midland, Mich.) is mixed with water, and MELAPUR® MC XL (melamine cyanurate available from Ciba Specialty Chemicals Corporation) in a plastic container in amounts as given in Table 1. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed fir 3 minutes thereby entraining air and producing a froth.

The froth is spread onto the back of a 100% polyester mattress ticking having a fabric weight of 100 g/m² and is smoothed to a height of 0.25 inches (6.4 mm). A polypropylene non-woven fabric having a weight of 18.3 g/m² is laid on top of the smoothed froth. The froth is placed in a Blue M forced air oven at drying temperature of approximately 75° C. for 50 minutes. The resulting final foam height after drying, final foam/fabric structure foam weight, and foam density are given in Table 1. The resulting final foams has a composition of approximately 60% MELAPUR® MC XL and 40% dispersion solids. As can be readily observed, the amount of water in the mixture has a dramatic impact on the density of the final foam.

TABLE 1

| | Sample | | |
|---|---|---|---|
| | Ex. 6 | Ex. 7 | Ex. 8 |
| MELAPUR ® MC XL | 67.68 g | 67.73 g | 67.63 g |
| Aqueous Dispersion | 87.78 g | 88.00 g | 89.13 g |
| Water | 17.68 g | 27.10 g | 36.61 g |
| Final Foam Height | 5.07 mm | 5.32 mm | 5.57 mm |
| Final Foam Weight | 1341 g/m² | 934 g/m² | 706 g/m² |
| Final Foam Density | 0.264 g/cm³ | 0.176 g/cm³ | 0.127 g/cm³ |
| MELAPUR ® MC XL Content | 60.0% | 60.0% | 59.7% |

Example 9, 10, 11, 12

A blend of an aqueous dispersion having a composition of 48.7% water, 49.06% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_n$COOH, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with water, MARTINAL® OL-107C aluminum hydroxide, and MELAPUR® MC XL melamine cyanurate in a plastic container in amounts as given in Table 2. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The froth is spread onto the back of a 100% polyester mattress ticking having a fabric weight of 100 g/m² and is smoothed to a height of 70.25 inches (6.4 mm). A polypropylene non-woven fabric having a weight of 18.3 g/m² is laid on top of the smoothed froth. The froth is placed in a Blue M forced air oven at drying temperature of approximately 75 deg C. for 50 minutes. The resulting final foam height after drying, final foam/fabric structure foam weight, and foam density are given in Table 2.

TABLE 2

|  | Sample | | | |
| --- | --- | --- | --- | --- |
|  | Ex. 9 | Ex. 10 | Ex. 11 | Ex. 12 |
| MARTINAL ® OL-107C | 59.85 g | 68.40 g | n/a | n/a |
| MELAPUR ® MC XL | n/a | n/a | 67.68 g | 67.63 g |
| Aqueous Dispersion | 95.00 g | 91.07 g | 87.78 g | 89.13 g |
| Water | 30.60 g | 19.20 g | 17.68 g | 36.61 g |
| Final Foam Height | 5.51 mm | 5.16 mm | 5.07 mm | 5.02 mm |
| Final Foam Weight | 692 g/m² | 1303 g/m² | 1341 g/m² | 670 g/m² |
| Final Foam Density | 0.126 g/cm³ | 0.253 g/cm³ | 0.264 g/cm³ | 0.134 g/cm³ |
| FR Content | 55.1% | 59.4% | 60.0% | 59.7% |

Example 13

A blend of 91.32 grams of an aqueous dispersion having a composition of 48.7% water, 49.06% copolymer of ethylene/ 1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_n$ COOH, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with 25.84 grams of water, and 68.65 grains of MARTINAL® OL-107C (aluminum hydroxide available from Albemarle Corporation) in a plastic container. The mixture is shaken and homogenized using a household high shear hand held mixer (Hamilton Beach TURBO-TWISTER™). The mixture is placed in a conventional mixing howl under a Hobart-type stand mixer fitted with a wire beater. The blend is mixed on high speed for 3 minutes thereby entraining air and producing a froth.

The froth is spread onto the back of a 100% polyester mattress ticking having a fabric weight of 100 g/m² and is smoothed to a height of 0.125 inches (3.2 mm). A non-woven glass mat (416 g/m² weight, 0.054 cm thickness, available from Owens Corning Corporation) is laid on top of the smoothed froth. An additional layer of froth is spread onto the back of the glass mat and is smoothed to a height of 0.125 inches (3.2 mm). A polypropylene non-woven fabric having a weight of 18.3 g/m² is laid on top of this second layer of smoothed froth. The froth is placed in a Blue M forced air oven at drying temperature of approximately 75° C. for 50 minutes. The resulting final total foam height after drying is measured to be 5.57 mm. The resulting final foam/glass mat/ fabric structure has a foam weight of 1237 g/m² and a foam density of 0.222 g/cm³. The resulting final foam has a composition of 59.4% MARTINAL® OL-107C and 40.6% dispersion solids.

Flame Resistance Testing

The foam laminates of examples 9, 10, 11, 12, and 13 are tested for flame and thermal resistance according to the direct under burn test. The direct under burn test gives an indication of a materials ability to resist a direct fire and insulate from the heat of the fire. Whereas ASTM D4986 Standard Test Method for Horizontal Burning Characteristics of Cellular Polymeric Materials provides an indication of a materials ability to resist the propagation of a direct flame, the direct under burn test provides an indication of the materials ability to mitigate the heat propagation from a direct flame. The sample is supported on a widely spaced (1 inch by 1 inch) metal grid approximately 1 cm above the top of a burner fan such that the flame is in direct contact with the sample. A thermocouple capable of withstanding the test temperature is fixed in direct contact with the back (non-flame) side of the sample. A piece of urethane loath, approximately ½" thick is then placed on top of the sample and the thermocouple to provide insulation for a more accurate measurement of back Sample temperature. Another widely spaced grid is then placed on the urethane foam to hold the sample flat during the test. A flame source, similar to that used in ASTM D4986, is then placed under the sample for a period of 120 seconds. The back surface temperature, as measured by the thermocouple, is then recorded versus time. Materials that are good at resisting flame, such as glass non-wovens, but not good at insulating will have a rapid temperature rise in this test. Materials that are good at insulating, but not good at resisting flame, such as urethane foam will have a rapid temperature rise in this test as they combust. The back surface temperature versus time data is given in Table 3.

TABLE 3

| Elapsed Time | Temperature (° F.) | | | | |
| --- | --- | --- | --- | --- | --- |
| (seconds) | Ex. 9 | Ex. 10 | Ex. 11 | Ex. 12 | Ex. 13 |
| 0 | 75 | 75 | 74 | 82 | 76 |
| 5 | 96 | 87 | 84 | 110 | 75 |
| 10 | 142 | 111 | 105 | 148 | 78 |
| 15 | 242 | 134 | 130 | 272 | 93 |
| 20 | 338 | 156 | 150 |  | 107 |
| 25 | 522 | 183 | 169 |  | 136 |
| 30 |  | 226 | 196 |  | 147 |
| 35 |  | 260 | 223 |  | 149 |
| 40 |  | 287 | 258 |  | 152 |
| 45 |  |  |  |  | 184 |
| 50 |  |  |  |  | 218 |
| 55 |  |  |  |  | 263 |
| 60 |  |  |  |  | 302 |
| 75 |  |  |  |  | 400 |
| 80 |  |  |  |  | 436 |
| 90 |  |  |  |  | 455 |

Examples 14, 15, 16

A blend of an aqueous dispersion having a composition of 48.7% water, 49.06% copolymer of ethylene/1-octene content of 62/38 percent (ENGAGE® 8200 elastomer which is supplied by The Dow Chemical Company), 1.02% UNI- CID® 350 (a mono-acid obtained from Baker-Petrolite Corp., Cincinnati, Ohio, of the formula $CH_3(CH_2)_nCOOH$, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with water and MARTINAL® OL-107C aluminum hydroxide or MELAPUR® MC XL melamine cyanurate in a plastic container. The wet weight percent of aqueous dispersion, flame retardant, and water is 48.7%, 37.5%, and 13.8% respectively to give a 60 wt. % flame retardant foam on a dry basis. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The MARTINAL® OL-107C froth is spread onto the back of a polypropylene non-woven fabric having a fabric weight of 18.3 $g/m^2$ and is smoothed to a height of 0.125 inches (3.2 mm). A non-woven glass mat (weight and product as given in Table 4, available from Owens Corning Corporation) was laid on top of the smoothed froth. A layer of MELAPUR® MC XL froth is spread onto the back of the glass mat and is smoothed to a height of 0.125 inches (3.2 mm). A 100% polyester mattress ticking having a fabric weight of 100 $g/m^2$ is laid on top of this second layer of smoothed froth. The froth is placed in a Blue M forced air oven at drying temperature of approximately 75° C. for 70 minutes. The resulting final total laminate height after drying and final foam weight are given Table 4.

TABLE 4

|  | Sample | | |
| --- | --- | --- | --- |
|  | Ex. 14 | Ex. 15 | Ex. 16 |
| Glass Mat Weight | 25 $g/m^2$ | 50 $g/m^2$ | 300 $g/m^2$ |
| Owens Corning Product | ECR25A | ECR50A | VL8101 |
| Total Laminate Height | 6.51 mm | 6.62 mm | 6.71 mm |
| Final Foam Weight | 1221 $g/m^2$ | 1280 $g/m^2$ | 950 $g/m^2$ |

Flame Resistance Testing

The foam laminates of examples 14, 15 and 16 were tested for flame and thermal resistance according to the direct under burn test. The back surface temperature versus time data is given in Table 5.

TABLE 5

| Elapsed Time | Temperature (° F.) | | |
| --- | --- | --- | --- |
| (seconds) | Ex. 14 | Ex. 15 | Ex. 16 |
| 0 | 82 | 83 | 81 |
| 10 | 91 | 89 | 85 |
| 15 | 106 | 96 | 94 |
| 20 | 141 | 112 | 106 |
| 25 | 231 | 133 | 119 |
| 30 | 345 | 178 | 134 |
| 35 | 420 | 246 | 145 |
| 40 | 474 | 338 | 167 |
| 45 | 508 | 391 | 198 |
| 50 |  | 453 | 243 |
| 55 |  | 515 | 274 |
| 60 |  | 572 | 301 |
| 65 |  | 596 | 332 |

TABLE 5-continued

| Elapsed Time | Temperature (° F.) | | |
| --- | --- | --- | --- |
| (seconds) | Ex. 14 | Ex. 15 | Ex. 16 |
| 70 |  | 607 | 370 |
| 75 |  | 623 | 403 |
| 80 |  | 639 | 448 |
| 85 |  | 654 | 463 |
| 90 |  | 672 | 478 |
| 95 |  | 686 | 510 |
| 100 |  | 700 | 526 |
| 110 |  | 710 | 555 |
| 120 |  |  | 571 |
| 130 |  |  | 592 |
| 140 |  |  | 614 |
| 150 |  |  | 633 |
| 160 |  |  | 659 |

Example 17, 18

A blend of an aqueous dispersion having a composition of 48.8% water, 48.95% copolymer of ethylene/1-octene content of 62/38 percent (ENGAGE® 8200 elastomer which is supplied by The Dow Chemical Company), 1.02% UNI-CID® 350 (a mono-acid obtained from Baker-Petrolite Corp., Cincinnati, Ohio, of the formula $CH_3(CH_2)_nCOOH$, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with water and MARTINAL® OL-104C aluminum hydroxide in a plastic container in an amount as given in the table below. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The MARTINAL® OL-104C froth is spread onto the back of a polypropylene non-woven fabric having a fabric weight of 18.3 $g/m^2$ and is smoothed to a height of 0.250 inches (6.4 mm). A non-woven glass mat (Owens Corning Corporation, 70 $g/m^2$, 0.72 mm thickness) is laid on top of the smoothed froth. The froth is placed in a Blue M forced air oven at drying temperature of approximately 75° C. for 70 minutes. The resulting final total laminate height after drying and final foam weight are given in Table 6.

TABLE 6

|  | Sample | |
| --- | --- | --- |
|  | Ex. 17 | Ex. 18 |
| MARTINAL ® OL-104C | 88.17 grams | 115.17 grams |
| Aqueous Dispersion | 210.15 grams | 150.05 grams |
| Water | 16.20 grams | 33.42 grams |
| MARTINAL ® OL-104C | 45% | 60% |
| Total Laminate Height | 6.88 mm | 7.12 mm |
| Final Foam Weight | 564 $g/m^2$ | 921 $g/m^2$ |

Example 19, 20, 21

A blend of 420.29 grams of an aqueous dispersion having a composition of 48.8% water, 48.95% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_nCOOH$, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with 32.57 grams of water and 176.33 grams of MARTINAL® OL-104C aluminum hydroxide in a plastic container to give a foam with a final dry level of MARTINAL® OL-104C of 45%. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The MARTINAL® OL-104C froth is spread onto the back of a non-woven glass mat (Owens Corning Corporation, 70 g/m², 0.72 mm thickness) and is smoothed to a height of 0.250 inches (6.4 mm). The froth is placed in a Blue M forced air oven at drying temperature of approximately 75° C. for 70 minutes. The final weight of the MARTINAL® OL-104C foam is given in Table 7.

A blend of an aqueous dispersion having a composition of 48.8% water, 48.95% copolymer or ethylene/1-octene content of 62/38 percent (ENGAGE® 8200 elastomer which is supplied by The Dow Chemical Company), 1.02% UNICID® 350 (a mono-acid obtained, from Baker-Petrolite Corp., Cincinnati, Ohio, of the formula $CH_3(CH_2)_nCOOH$, wherein n has an average value of about 23), 1.02% HYSTRENE® 4516 (stearic acid available from Chemtura Corporation), 0.18% METHOCEL® E4MP (methyl cellulose derivative commercially available from The Dow Chemical Company, Midland, Mich.), and 0.028% DOWICIL® 200 (a biocide commercially available from The Dow Chemical Company, Midland, Mich.) is mixed with water and MELAPUR® MC XL melamine cyanurate in a plastic container in the amounts given in the table below. The mixture is shaken and homogenized using a household high shear hand held mixer (Hamilton Beach TURBO-TWISTER™). The mixture is placed in a conventional mixing bowl under a Hobart-type stand mixer fitted with a wire beater. The blend is mixed on high speed for 3 minutes thereby entraining air and producing a froth.

The MELAPUR® MC XL froth is spread onto the other side of the non-woven glass mat and is smoothed to a height as given in the table below. The froth is again placed in a Blue M forced air oven at drying temperature of approximately 75° C. for 70 minutes. The resulting final total laminate height after drying and final foam weight are given in Table 7.

Flame Resistance Testing

The foam laminates of examples 17, 18, 19, 20, and 21 are tested for flame and thermal resistance according to the direct under burn test. The back surface temperature versus time data is given in Table 8.

TABLE 8

| Elapsed Time | Temperature (° F.) | | | | |
|---|---|---|---|---|---|
| (seconds) | Ex. 17 | Ex. 18 | Ex. 19 | Ex. 20 | Ex. 21 |
| 0 | 70 | 83 | 81 | 81 | 82 |
| 10 | 90 | 89 | 83 | 83 | 85 |
| 15 | 125 | 103 | 85 | 88 | 96 |
| 20 | 160 | 121 | 91 | 98 | 110 |
| 25 | 314 | 148 | 102 | 115 | 138 |
| 30 | 462 | 216 | 116 | 133 | 233 |
| 35 | 543 | 301 | 133 | 149 | 399 |
| 40 | 576 | 405 | 172 | 210 | 504 |
| 45 | 599 | 550 | 253 | 380 | 580 |
| 50 | 620 | 613 | 371 | 498 | 613 |
| 55 | 642 | 641 | 473 | 554 | 633 |
| 60 | 659 | 659 | 530 | 586 | 647 |
| 65 | 676 | 684 | 570 | 604 | 658 |
| 70 | 704 | 706 | 596 | 626 | 669 |
| 75 | 729 | 730 | 609 | 640 | 685 |
| 80 | 751 | 747 | 623 | 651 | 703 |
| 85 | 766 | 771 | 636 | 665 | 714 |
| 90 | 772 | 781 | 645 | 659 | 713 |
| 95 | 776 | 788 | 655 | 657 | 718 |
| 100 | 779 | 794 | 661 | 648 | 732 |
| 105 | 781 | 800 | 669 | 655 | 741 |
| 110 | 781 | 808 | 676 | 645 | 733 |
| 115 | 782 | 812 | 682 | 649 | 734 |
| 120 | 783 | 819 | 693 | 648 | 731 |

Example 22, 23, 24

A blend of an aqueous dispersion having a composition of 48.8% water, 48.95% copolymer of ethylene/1-octene content of 62/38 percent (ENGAGE® 8200 elastomer which is supplied by The Dow Chemical Company), 1.02% UNICID® 350 (a mono-acid obtained from Baker-Petrolite Corp., Cincinnati, Ohio, of the formula $CH_3(CH_2)_nCOOH$, wherein n has an average value of about 23), 1.02% HYSTRENE® 4516 (stearic acid available from Chemtura Corporation), 0.18% METHOCEL® E4MP, (methyl cellulose derivative commercially available from The Dow Chemical Company, Midland, Mich.), and 0.028% DOWICIL® 200 (a biocide commercially available from The Dow Chemical Company, Midland, Mich.) is mixed with water and MICRONAL® DS5001 (phase change micro-capsules available from BASF) in a plastic container according to the weights given in the table below. The mixture is shaken and homogenized using a household high shear hand held mixer (Hamilton Beach TURBO-TWISTER™). The mixture is

TABLE 7

| | Sample | | |
|---|---|---|---|
| | Ex. 19 | Ex. 20 | Ex. 21 |
| MELAPUR ® MC XL | 48.7 grams | 25.3 grams | 25.3 grams |
| Aqueous Dispersion | 95.08 grams | 115.58 grams | 115.58 grams |
| Water | 9.34 grams | 0.00 grams | 0.00 grams |
| MELAPUR ® MC XL | 50% | 29.9% | 29.9% |
| Wet Foam Smoothed Height | 4.76 mm | 4.76 mm | 3.18 mm |
| Total Laminate Height | 9.28 mm | 9.69 mm | 8.51 mm |
| Final MARTINAL ® OL-104C Foam Weight | 513 g/m² | 522 g/m² | 528 g/m² |
| Final MELAPUR ® MC XL Foam Weight | 704 g/m² | 316 g/m² | 213 g/m² | placed in a conventional mixing bowl under a Hobart-type stand mixer fitted with a wire beater. The blend is mixed on high speed for 3 minutes thereby entraining air and producing a froth.

The froth is spread, onto the back of a 58% polyester/42% acrylic upholstery fabric having a fabric weight of 256 g/m$^2$ and is smoothed to a height of 0.25 inches (6.4 mm). The froth is placed in a Blue M forced air oven at drying temperature of approximately 75° C. for 60 minutes. The resulting foam height, foam weight, and foam density are given in Table 9.

TABLE 9

| | Sample | | |
|---|---|---|---|
| | Ex. 22 | Ex. 23 | Ex. 24 |
| MICRONAL ® DS5001 | 14.07 grams | 37.51 grams | 0 grams |
| Aqueous Dispersion | 110.05 grams | 110.15 grams | 100 grams |
| Water | 0.00 grams | 7.75 grams | 0 grams |
| MICRONAL ® DS5001 | 20% | 39.9% | 0% |
| Dry Foam Height | 5.77 mm | 5.96 mm | 4.82 mm |
| Dry Foam Weight | 436 g/m$^2$ | 862 g/m$^2$ | 203 g/m$^2$ |
| Dry Foam Density | 0.076 g/cm$^3$ | 0.145 g/cm$^3$ | 0.042 g/cm$^3$ |

Figure 2:
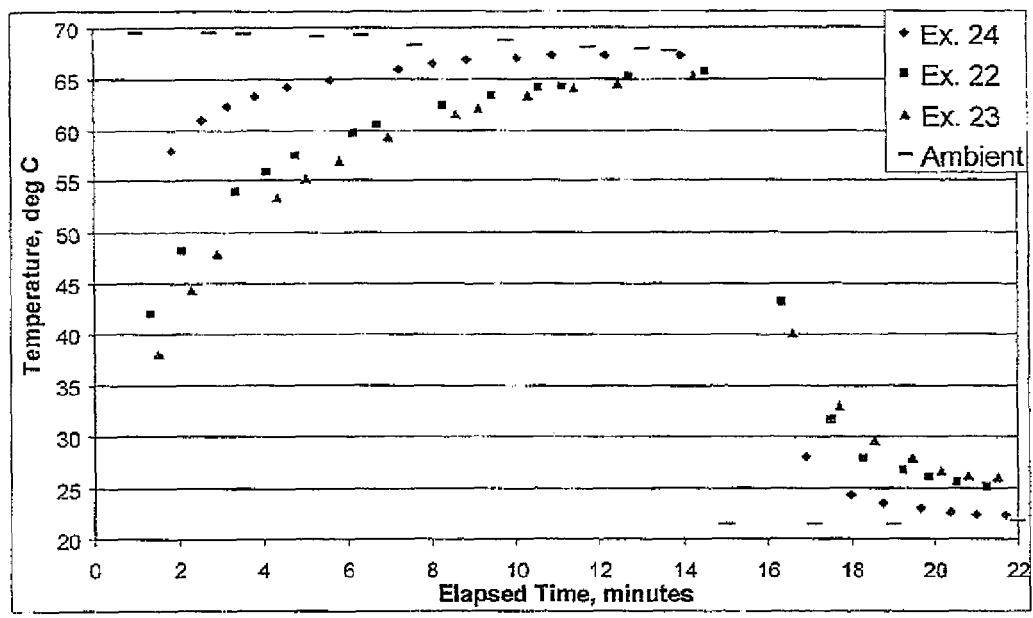
FIG. 2 presents the temperature versus time behavior of embodiments of the foam/upholstery structures disclosed herein.

The foams from examples 22, 23, and 24 are placed in a forced air oven which has been preheated to 70° C. Thermocouple probes are inserted between the upholstery fabric and the foam. The forced air oven is shut off. The temperature versus time behavior of the foam/upholstery structures is given in FIG. 2.

Example 25

35.0 g of aluminum hydroxide powder was added to 108.7 g of an aqueous olefin dispersion comprising 49% water, 46.6% ENGAGE® 8200 (an ethylene-octane copolymer commercially available from The Dow Chemical Company, Midland, Mich.), 2% UNICID® 350 (a mono-acid obtained from Baker-Petrolite Corp., Cincinnati, Ohio, of the formula $CH_3(CH_2)_n COOH$, wherein n has an average value of about 23), 1% stearic acid, 1% STEPANOL® WAT-K. (Tea Lauryl Sulfate, commercially available from Stepan Chemical Company, Northfield, Ill.), 0.35% METHOCEL® E4MP (methyl cellulose derivative commercially available from The Dow Chemical Company, Midland, Mich.), and 0.05% DOWICIL® 200 (a biocide commercially available from The Dow Chemical Company, Midland, Mich.). The mixture was vigorously shaken to disperse the aluminum hydroxide powder into the liquid, and then was diluted with 24.9 g of water. The mixture was then mixed at high speed for 3-5 minutes until a froth is generated. This froth is applied to the back of a textile fabric using ¼ inch stand-offs and a screed. The froth-laden fabric is then placed into an air convection Oven at 75° C. for 25 minutes to drive off water and form the olefin foam.

The foam fabric structure generated by the procedure described above has a foam weight of 613 g/m$^2$ and a foam density of 0.165 g/cm$^3$. When tested for flammability according to ASTM D4986 Standard Test. Method for Horizontal Burning Characteristics of Cellular Polymeric Materials the foam fabric structure provided a hum propagation rate of 3.5 cm in 3 minutes compared to over 11 can in 3 minutes for a control material with no flame retardant in the foam/fabric structure.

While references to the use of the disclosed foams in flame retardant fabric articles may have been made, no limitation on the present invention was intended by such description. Rather the foams disclosed herein may specifically find use absorbent articles, sound deadening materials, thermal insulating materials, packaging materials, or other applications where foams may be useful.

Advantages of embodiments disclosed herein may include one or more of the following. Access to foams with high loading of flame retardant additives may be possible because of the open cell structure produced in the frothing process. The open cell structure may exhibit desirable properties for the resultant foam including elasticity and soft feel for fabric applications. Further, the open cell structure may be generated through frothing, obviating the need to include a mechanical opening of a closed cell foam. Finally, the foams may be generated under ambient temperature conditions and without the need of any blowing agents.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. An open-cell flame retardant foam derived from an aqueous froth comprising:
    a) a thermoplastic resin comprising an ethylene homopolymer, an ethylene/α-olefin copolymer, or an ethylene/α-olefin multiblock interpolymer; a polypropylene homopolymer, a propylene/α-olefin copolymer, or a propylene/α-olefin multiblock interpolymer; or combinations thereof;
    b) water;
    c) a frothing surfactant comprising at least one of alkylcellulose ethers, hydroxyalkyl cellulose ethers, hydroxyalkyl alkylcellulose ethers, guar gum, xanthan gum, and polyoxyethylene resins of at least 20,000 molecular weight;
    d) a gas;
    e) at least one flame retardant comprising at least one selected from an inorganic salt, an intumescent, a halogenated compound, a phosphate compound, a borate compound, a melamine compound, and combinations thereof; and
    f) a dispersion-stabilizing agent;
    wherein the froth comprises from about 15 to 75 weight percent component (a), from about 25 to 75 weight percent component (b), from about 0.1 to 10 weight percent component (c), from about 5 to 50 weight percent component (e), and wherein (d) is present in an amount such that (d) comprises at least 10 percent of the total volume of all components present in the froth; and
    wherein the at least one flame retardant comprises from about 5 to about 70% of a total weight of the thermoplastic resin, the at least one stabilizing agent and the at least one flame retardant.

2. The foam of claim 1, wherein the cell size of the majority of cells of the foam ranges between about 5 and about 1000 microns.

3. The foam of claim 1, wherein the foam has a horizontal burn length of 80% or lower than a non-flame retardant control sample according to ASTM D4986 Standard Test Method for Horizontal Burning Characteristics of Cellular Polymeric Materials.

4. The foam of claim 1, wherein the density of the foam on a dry basis is between about 0.02 g/cm$^3$ and about 0.30 g/cm$^3$.

5. A laminated structure comprising (a) at least one layer of the foam of claim 1, and (b) at least one substrate layer to which the foam layer (a) is adhered.

6. The laminated structure of claim 5, wherein the at least one substrate layer is selected from a layer of a foam, a thermoplastic sheet or film, a woven or non-woven fabric, fiberglass, or melt spun bonded or melt blown material.

7. The laminated structure of claim 5, wherein the foam layer has a density different from that of the substrate.

8. The laminated structure of claim 5, wherein the foam layer comprises at least a first and a second layer of the foam of claim 1, and wherein the first layer has a density different from that of the second layer.

9. A flame retardant article comprising the laminated structure of claim 5.

* * * * *